April 28, 1925.

W. STANLEY ET AL 1,535,957

ARTIFICIAL BAIT

Filed Dec. 18, 1922

Inventors:
William Stanley
Charles J. Stanley

Patented Apr. 28, 1925.

1,535,957

UNITED STATES PATENT OFFICE.

WILLIAM STANLEY AND CHARLES J. STANLEY, OF CHICAGO, ILLINOIS.

ARTIFICIAL BAIT.

Application filed December 18, 1922. Serial No. 607,507.

*To all whom it may concern:*

Be it known that we, WILLIAM STANLEY and CHARLES J. STANLEY, both citizens of the United States, residing at Chicago, in the county of Cook and State of Illinois, have invented certain new and useful Improvements in Artificial Bait, of which the following is a specification.

This invention is directed to an artificial bait which employs a body or plug designed to simulate the body of a minnow in advance of which is located a spinner which is guided by means of prongs to prevent entanglement with the weeds or other obstructions. The bait is designed to have secured thereto a piece of pork rind or the like which trails behind the bait to simulate a lifelike appearance.

The present invention relates to the construction of the body; to the means for securing the hook to the body; to the means for securing the tail piece to the body; to the means for co-relating the weed guard to the body in such a manner as to provide a clearance of the operation of the spinner; and to the provision of an elevating device designed to buoy up the device when used as a surface bait.

The invention also relates to the construction of the tail piece to prevent its fouling with the hook.

In the drawing:

Figure 1 is a perspective view of the entire device as used for an under-water bait;

Fig. 2 is a longitudinal section through the body showing portions of the device in elevation;

Fig. 3 is a perspective view of the clamping plate for securing the hook and affording attachment for the tail piece;

Fig. 4 is a cross sectional elevation taken through line 4—4 of Fig. 2;

Fig. 5 is a similar view taken through line 5—5 of Fig. 2;

Fig. 6 is a detail showing the lifting device attached to the forward end of the connection for the body;

Fig. 7 is a sectional plan view of the same taken on line 7—7 of Fig. 6; and

Fig. 8 is a plan view of the lifting device.

The bait comprises a plug 10 which is configured to simulate the form of a minnow, which plug is formed in two sections. The body section 11 is longitudinally shouldered on each side at the point 12, the under portion of the body being of reduced diameter with respect to the upper portion. The body has fitted thereto on its under side an under section 13 which is of dished formation and fits snugly against the reduced portion of the body, and snugly against the shouldered portion to present a flush or uniformly rounded exterior surface. The body and under section are formed preferably of some composition such as celluloid or the like in contrasting colors, such as red and white, and secured together by cementing under pressure, so as to integrally knit the two sections together. The formation is one which enables a sharp line of demarcation in color to be observed between the upper and lower sections, and enables the body portion to be highly finished or polished to present an extremely attractive appearance.

The lower portion of the body section is provided with a recess 14 which receives a block of lead 15 or the like which serves to properly balance the bait and maintain it in upright position, which block or ballast is completely housed and walled in by the lower or sheath section of the plug so as to be invisible and at the same time firmly held against displacement. The upper surface of the body at its rear end is provided with a longitudinally extending open groove or channel 16 which merges into an enlarged recess 17 at its forward end. The channel at its rear end terminates in a bridge 18 which overlies a bore 19, the bore being of sufficient size to permit the barb 20 of a hook 21 to be slipped through the bore beneath the bridge so as to bring the shank 22 of the hook within the open groove or channel and bring the eye 23 of the hook shank within the recess 17. This serves to maintain the hook and barb in upwardly projecting position, and the hook is clamped and held in this position by the provision of a flat clamping plate 24 which is provided with an enlarged head 25 of a size to fit snugly within the recess 17, holding the body of the plate in firm contact with the shank of the hook. The parts are clamped in this position by means of a headed screw 26 which is threaded downwardly onto the body of the plug.

The rear end of the clamping bar is offset at the point 27 and terminates in a T-shaped cross head 28 which overlies the bridge 18 and serves to afford a point of attachment for a tail piece 29 of pork rind or other flexible material. The tail piece is provided with a slit 30 at its forward end through which the T-head 28 is entered, and through which the hook projects, as best indicated in Fig. 1. In attaching the tail piece, the hook is first entered through the slit and the slit in the tail piece is then brought into parallel relation to the T-head 28 and slipped down over the latter after which the tail piece is straightened out and the slit brought into transverse relation to the T-head, holding the tail piece firmly in position with the hook projecting above it. The tail piece is provided along each edge with a series of obliquely disposed cuts or slits 31 arranged in staggered relation on opposite sides, the object of this arrangement being to prevent the tail piece from catching over the point of the hook in making a cast. The edge slits are so disposed that if the tail piece be flipped forwardly against the point of the hook, the barb will in almost every instance slip through one of the side slits, thereby freeing the tail piece from the point of the hook.

The plug is provided at its forward end with an attaching eye 32 on the forward end of a shank 33, the rear end of which is deeply threaded onto the body of the plug. The forwardly protruding end of the shank affords a mounting for a weed guard which comprises a pair of rearwardly diverging obliquely disposed prongs 34 which are composed of spring wire and normally occupy the position indicated in Fig. 1. The forward converging ends of the prongs are united and entered through a small flat head plate 35 provided with a tongue 35$^a$ against which the prongs lie. The end of the tongue is enlarged to provide a pair of lugs 35$^b$ which prevent displacement of a collar 36 which encircles the oppositely disposed forward ends of the prongs and the intermediate tongue and locks the parts together.

The head plate is pivoted between a pair of ears 37 which are struck up from a fitting 38 which embraces the shank 33. Immediately to the rear of the ears are located a pair of contacting stop fingers 39 which, like the ears, are struck up from the fitting. The eye 32 constitutes a stop for limiting the forward swing of the weed guard, as indicated by dotted lines in Fig. 2, and the united stop fingers 39 constitute a stop for limiting the rearward swing of the weed guard, so that the weed guard cannot approach more closely toward the body of the plug than is indicated in the drawings.

Between the fitting 38 and the forward end of the plug is located a spinner 40 provided with a pair of rearwardly diverging blades 41, washers 42 and 43 being provided to afford smooth bearing surfaces for the operation of the spinner. The stop arrangement for the weed guard maintains the latter in suitably elevated position to afford a clearance for the rotation of the spinner, and the body of the plug at its forward end is tapered to conform to this requirement.

When it is desired to use the device as an underwater bait, the line is attached directly to the eye 32, but when it is desired to cause the bait to ride along the surface, the lifting device of Figs. 6 and 7 is employed. This lifting device consists of a pair of wings 43 which, when viewed in plan, present a heart-shaped appearance. The wings extend laterally in upwardly diverging relation to one another, and each wing extends in an oblique plane from front to rear, being slightly elevated at its forward edge after the manner of a pair of aeroplane wings to cause a lifting or elevating action as the device is trailed through the water.

The lower inner edge 44 of each wing merges into and connects with a flat vertically disposed body section 45, the two body sections being in contact with one another and being provided near the forward end with a hole or perforation 46 to which the fish line may be attached when the lifting device is used. The rear end of each body section is extended to form an ear 47, the two ears being offset slightly to furnish a bifurcated connection for receiving the eye 32 of the shank 33.

The ears are provided with registering perforations 48 adapted to receive a pin 49 carried at the rear end of a spring arm 50 which is secured by a rivet 51 or the like to the body of the lifting device near the forward end thereof. To detach the lifting device, the spring arm is pulled back retracting the pin sufficiently to release the eye 32.

In using the bait either with or without the lifting device, the pork rind or other tail piece may be readily attached in the manner previously indicated, and the bait may then be cast in the usual manner. The weed guard will prevent fouling of the bait and at the same time maintain a position such that it will not interfere in any way with the operation of the spinner as the bait is reeled back after the cast. In case of a strike, the weed guard prongs are sufficiently remote from the barb of the hook to prevent interference with the strike, but in case they are struck by the fish, they may easily be thrown back into the dotted line position shown in Fig. 2. This form of weed guard is peculiarly adapted for use in connection with a plug and spinner of the character indicated, in that ample clearance is afforded for the operation of the spinner and at the same time the spinner interferes in no way with the proper functioning of the weed guard.

The method of clamping the hook and securing the tail piece is one which serves to hold the hook firmly in upright position and at the same time affords a ready and convenient means for permitting replacement of a hook or renewal of a tail piece as occasion may require. The method of securing the tail piece serves to hold the latter in proper flatwise relation with respect to the hook and prevents accidental detachment of the tail piece and at the same time the nitched formation of the edges of the tail piece prevents fouling of the hook, and also increases the liveliness of the tail piece and the lifelike appearance given to the bait as a whole.

We claim:

1. In a fish bait, the combination of a plug configured to resemble a minnow body, a spinner having a rearwardly extending obliquely disposed blade overlying the forward end of the plug and swivelly mounted in advance of the plug, weed guard prongs pivoted in advance of the spinner and normally extending rearwardly and outwardly over the spinner and plug, and a stop member for limiting the rearward swing of the prongs to prevent interference of the spinner, substantially as described.

2. In a fish bait, the combination of a plug configured to resemble the body of a minnow, a rigid shank forwardly extending from the plug, a spinner rotatably mounted on the shank and provided with a blade extending rearwardly and outwardly over the forward end of the plug, weed guard prongs pivoted to the shank in advance of the spinner and normally extending in diverging relation to one another rearwardly and outwardly over the spinner and over the plug, and a stop member for limiting the rearward swing of the prongs to prevent interference of the spinner, substantially as described.

3. In a fish bait, the combination of a plug consisting of a body section shouldered along its sides and reduced on its lower portion, and an under sheath section surrounding and secured to the reduced lower portion of the body section and having its upper edges abutting against the shoulders thereon, the body and sheath sections being formed in contrasting colors, substantially as described.

4. In a fish bait, the combination of a plug consisting of a body section shouldered along its sides and reduced on its lower portion, an under sheath section surrounding and secured to the lower portion of the body section and having its upper edges abutting against the shoulders thereon, and a ballast block embedded within the body section and covered over by the sheath section, substantially as described.

5. In a fish bait, the combination of a plug provided along its rear upper side with a longitudinally extending groove terminating at its rear end in a bore cut through the terminal portion of the plug, a hook having its shank entered through the bore and the forward portion of the shank lying within the groove, a clamping plate for clamping the shank within the groove, said clamping plate terminating in a hook portion, and a flexible tail piece secured to the hook portion, substantially as described.

6. In a fish bait, the combination of a plug provided along its rear upper side with a longitudinally extending groove terminating at its rear end in a bore cut through a terminal portion of the plug, a hook having its shank entered through the bore and the forward portion of the shank lying within the groove, a clamping plate for clamping the shank within the groove, said clamping plate terminating in a hook portion, and a flexible tail piece secured to the hook portion and embracing the shank of the hook below the barb thereof, substantially as described.

7. In a fish bait, the combination of a plug provided in its rear upper surface with a longitudinally extending groove or channel terminating at its forward end with an enlarged recess and terminating at its rear end in a bore bridged over by an unbroken portion of the plug, a hook provided with a shank entered through the bore and lying within the groove or channel, and having an eye lying within the enlarged recess at the forward end of the channel, a clamping plate lying within the groove, and a screw entered through the clamping plate and through the eye of the hook, and into the body of the plug, substantially as described.

8. In a fish bait, the combination of a plug provided in its rear upper surface with a longitudinally extending groove or channel terminating at its forward end with an enlarged recess and terminating at its rear end in a bore bridged over by an unbroken portion of the plug, a hook provided with a shank entered through the bore and lying within the groove or channel, and having an eye lying within the enlarged recess at the forward end of the channel, a clamping plate lying within the groove, a screw entered through the clamping plate and through the eye of the hook, and into the body of the plug, the clamping plate at its rear end being upwardly offset to overlie the rear end of the plug, and a tail piece secured to the rear end of the clamping plate, substantially as described.

9. In a fish bait, the combination of a plug provided in its rear upper surface with a longitudinally extending groove or channel terminating at its forward end in an enlarged recess and terminating at its rear end in a bore bridged over by an unbroken portion of the plug, a hook provided with a shank entered through the bore and lying within the groove or channel, and having an eye lying within the enlarged recess at the forward end of the channel, a clamping plate lying within the groove, a screw entered through the clamping plate and through the eye of the hook, and into the body of the plug, the clamping plate at its rear end being upwardly offset to overlie the rear end of the plug and provided with a T-shaped cross head, and a tail piece provided with a slot engaging said cross head, substantially as described.

10. In a fish bait, the combination of a plug provided along its rear upper side with a longitudinally extending groove terminating at its rear end in a bore cut through the terminal portion of the block, a hook having its shank entered through the bore and the forward portion of the shank lying within the groove, an eye on the forward end of the hook shank, a clamping plate overlying the hook shank, and a securing means entered through the clamping plate and through the hook eye and into the body of the block for holding the hook shank and plate clamped within the groove, substantially as described.

11. In a fish bait, the combination of a plug, a hook secured to and extending rearwardly from the plug, and a thin broad flexible tail piece impaled on the hook, said tail piece being provided along its edges with incut slits, the slits on opposite sides being in staggered relation and adapted to permit said slitted edges to clear the hook point to prevent fouling thereof, substantially as described.

12. In a fish bait, the combination of a plug, a hook secured to and extending rearwardly from the plug, and a thin broad flexible tail piece impaled on the hook, said tail piece being provided along its edges with incut slits, adapted to permit said slitted edges to clear the hook point to prevent fouling thereof, substantially as described.

WILLIAM STANLEY.
CHARLES J. STANLEY.